US009495006B2

(12) United States Patent
Kim et al.

(10) Patent No.: US 9,495,006 B2
(45) Date of Patent: Nov. 15, 2016

(54) DISPLAY DEVICE AND METHOD OF CONTROLLING THE SAME

(75) Inventors: Sungun Kim, Seoul (KR); Soungmin Im, Seoul (KR);
(Continued)

(73) Assignee: LG ELECTRONICS INC., Seoul (KR)

(*) Notice: Subject to any disclaimer, the term of this patent is extended or adjusted under 35 U.S.C. 154(b) by 461 days.

(21) Appl. No.: 13/509,104

(22) PCT Filed: Nov. 3, 2010
(Under 37 CFR 1.47)

(86) PCT No.: PCT/KR2010/007725
§ 371 (c)(1),
(2), (4) Date: May 10, 2012

(87) PCT Pub. No.: WO2011/059202
PCT Pub. Date: May 19, 2011

(65) Prior Publication Data
US 2013/0050458 A1 Feb. 28, 2013

(30) Foreign Application Priority Data
Nov. 11, 2009 (KR) .................. 10-2009-0108387

(51) Int. Cl.
*H04N 13/02* (2006.01)
*G06F 3/01* (2006.01)
(Continued)

(52) U.S. Cl.
CPC ............... *G06F 3/011* (2013.01); *G06F 3/017* (2013.01); *G06F 3/048* (2013.01); *G06F 9/4446* (2013.01);
(Continued)

(58) Field of Classification Search
None
See application file for complete search history.

(56) References Cited

U.S. PATENT DOCUMENTS

2007/0103471 A1   5/2007  Yang et al.
2007/0120834 A1*  5/2007  Boillot .................... 345/173
(Continued)

FOREIGN PATENT DOCUMENTS

JP    2009-514109 A    4/2009
JP    2009-218910 A    9/2009
(Continued)

OTHER PUBLICATIONS

Nguyen et al., "Multi-view Human Recognition based on Face and Gait Features Detection," Journal of Korea Multimedia Society, vol. 11, No. 12, Dec. 2008, pp. 1676-1687 (13 pages total).

*Primary Examiner* — Geepy Pe
(74) *Attorney, Agent, or Firm* — Birch, Stewart, Kolasch & Birch, LLP

(57) ABSTRACT

The present disclosure is directed to a display device and a method of controlling the display device. The display device includes a memory that stores at least one first gesture image corresponding to at least one function, a camera that obtains a basic image including user's second gesture image, and a controller that extracts the second gesture image from the basic image and displays at least one third gesture image similar to the extracted second gesture image, wherein the third gesture image is included in the first gesture image stored in the memory. The display device and method of controlling the display device may guide a user to make a correct gesture by displaying a gesture image similar to a gesture made by the user among gesture images stored in a memory.

16 Claims, 20 Drawing Sheets

(75) Inventors: Byoungju Kim, Seoul (KR); Jiyoung Hong, Seoul (KR); Minsun Kim, Seoul (KR); Kyungjin Kim, Seoul (KR)

(51) Int. Cl.
| | |
|---|---|
| *G06F 3/048* | (2013.01) |
| *G06F 9/44* | (2006.01) |
| *G06K 9/00* | (2006.01) |
| *H04N 21/4223* | (2011.01) |
| *H04N 21/485* | (2011.01) |

(52) U.S. Cl.
CPC ....... *G06K 9/00355* (2013.01); *G06K 9/00362* (2013.01); *H04N 21/4223* (2013.01); *H04N 21/485* (2013.01)

(56) References Cited

U.S. PATENT DOCUMENTS

| | | |
|---|---|---|
| 2007/0252898 A1 | 11/2007 | Delean |
| 2008/0052643 A1 | 2/2008 | Ike et al. |
| 2010/0281432 A1* | 11/2010 | Geisner et al. ............... 715/849 |
| 2011/0007142 A1* | 1/2011 | Perez et al. .................... 348/77 |

FOREIGN PATENT DOCUMENTS

| | | |
|---|---|---|
| KR | 10-0778757 B1 | 11/2007 |
| KR | 10-2010-0032699 A | 3/2010 |

* cited by examiner (a)          (b)

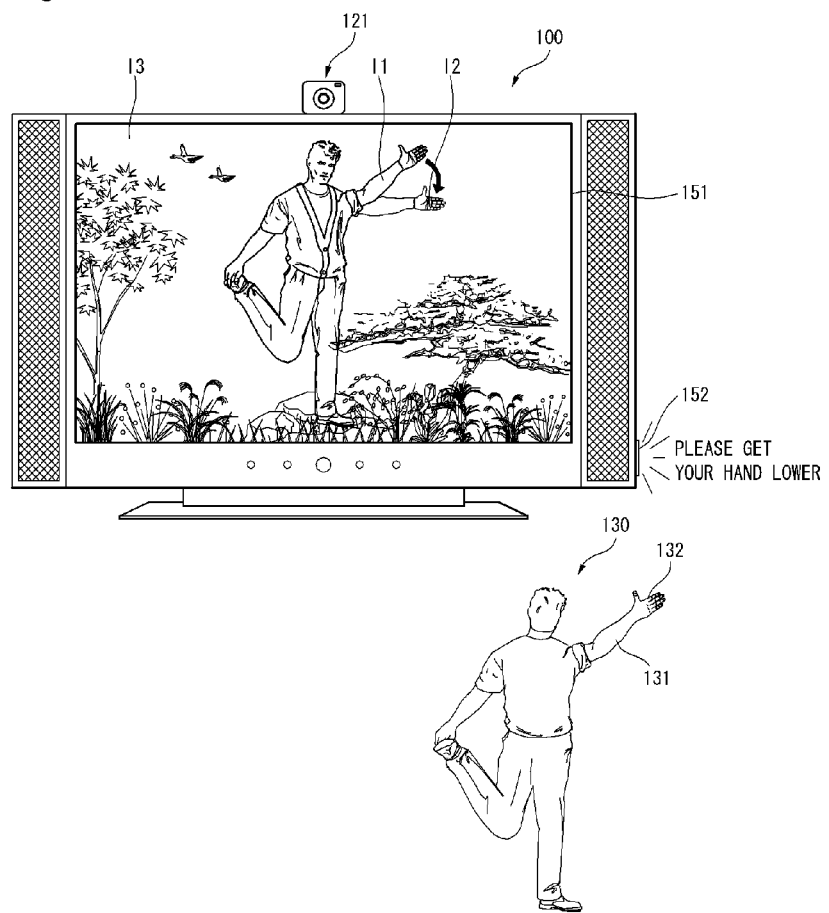

DISPLAY DEVICE AND METHOD OF CONTROLLING THE SAME

TECHNICAL FIELD

The present disclosure is directed to a display device and a method of controlling the display device. More specifically, the present disclosure is directed to a display device and a method of controlling the display device that may guide a user to make a correct gesture by displaying a gesture image similar to a gesture made by the user among gesture images stored in a memory.

BACKGROUND ART

Terminals, such as personal computers, laptop computers, cell phones, etc., are recently implemented as multimedia players that have various functions including capture of still or motion images, reproduction of music or moving pictures, games, or receipt of broadcast.

Such terminals may be classified into mobile terminals and stationary terminals according to whether the terminals are movable. The mobile terminals may be divided into handheld terminals and vehicle-mount terminals according to whether the terminals may be directly carried by a user.

An improvement in structure and/or software of a terminal may be considered to support and increase functions of the terminal.

DISCLOSURE OF INVENTION

Technical Problem

Exemplary embodiments of the present invention provide a display device and a method of controlling the display device that may guide a user to make a correct gesture by displaying a gesture image similar to a gesture made by the user among gesture images stored in a memory.

The present invention is not limited to the above embodiments, and further embodiments will be apparent by one of ordinary skill from the following description including the drawings and the claims.

Solution to Problem

According to an embodiment of the present invention, there is provided a display device including a memory that stores at least one first gesture image corresponding to at least one function, a camera that obtains a basic image including user's second gesture image, and a controller that extracts the second gesture image from the basic image and displays at least one third gesture image similar to the extracted second gesture image, wherein the third gesture image is included in the first gesture image stored in the memory.

According to an embodiment of the present invention, there is provided a display device including a memory that stores at least one first gesture image, a camera that obtains a basic image including user's second gesture image, and a controller that extracts the second gesture image from the basic image and displays at least one third gesture image similar to the extracted second gesture image, wherein the third gesture image is included in the first gesture image stored in the memory.

According to an embodiment of the present invention, there is provided a method of controlling a display device performing at least one function corresponding to user's gesture image, including obtaining a basic image including user's first gesture image, extracting the first gesture image from the obtained basic image, and when there is no function corresponding to the extracted first gesture image, displaying at least one second gesture image similar to the extracted first gesture image, wherein the second gesture image is included in gesture images corresponding to the at least one function.

Advantageous Effects of Invention

According to the exemplary embodiments of the present invention, the display device and method of controlling the display device may guide a user to make a correct gesture by displaying a gesture image similar to a gesture made by the user among gesture images stored in a memory.

BRIEF DESCRIPTION OF DRAWINGS

FIG. 32 is a view illustrating an operation of a display device according to an embodiment of the present invention.

MODE FOR THE INVENTION

Figure 1:
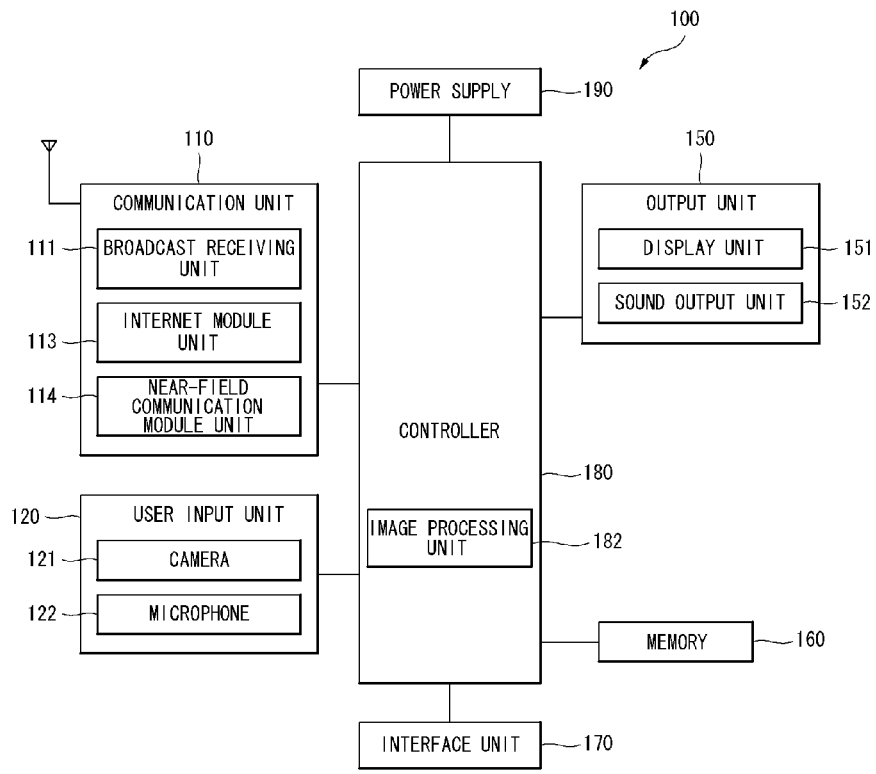
FIG. 1 is a block diagram illustrating a display device according to an embodiment of the present invention.

Hereinafter, exemplary embodiments of the present invention will be described in more detail with reference to the accompanying drawings, wherein the same reference numerals are used to denote the same or substantially the same elements throughout the drawings and the specification.

The terms "module" and "unit" may be used herein to have the same meaning for ease of description.

A display device according to the embodiments of the present invention may include a cellular phone, a smart phone, a laptop computer, a terminal for digital broadcasting, a personal digital assistant ("PDA"), a portable multimedia player ("PMP"), a GPS navigation device, etc.

FIG. 1 is a block diagram illustrating a display device according to an embodiment of the present invention.

A display device 100 may include a communication unit 110, a user input unit 120, an output unit 150, a memory 160, an interface unit 170, a controller 180, and a power supply unit 190. However, the display device 100 is not limited thereto, and may be configured to include more components or to include fewer components.

The communication unit 110 may include one or more modules that allows for communication between the display device 100 and a communication system or between the display device 100 and other devices. For example, the communication unit 110 may include a broadcast receiving unit 111, an internet module unit 113, a near-field communication module unit 114, etc.

The broadcast receiving unit 111 receives a broadcast signal and/or broadcast-related information from an external broadcast managing server through a broadcast channel.

The broadcast channel may include a satellite channel or a terrestrial channel. The broadcast managing server may include a server that generates and transmit a broadcast signal and/or broadcast-related information, or a server that receives a pre-generated broadcast signal and/or broadcast-related information and transmits the pre-generated broadcast signal and/or broadcast-related information to a terminal. The broadcast signal may include a TV broadcast signal, a radio broadcast signal, a data broadcast signal, as well as a mixed signal of a data broadcast signal and a TV broadcast signal or a radio broadcast signal.

The broadcast-related information may include information on a broadcast channel, a broadcast program, or a broadcast service provider. The broadcast-related information may be provided over a communication network.

The broadcast-related information may include various forms, for example, such as EPGs ("Electronic Service Guides") for DMB ("Digital Multimedia Broadcasting") or ESGs ("Electronic Service Guides") for DVB-H ("Digital Video Broadcast-Handheld").

The broadcast receiving unit 111 may receive a broadcast signal using various broadcast systems.

The broadcast signal and/or broadcast-related information received through the broadcast receiving unit 111 may be stored in the memory 160.

The internet module unit 113 is a module for internet access. The internet module unit 113 may be provided inside or outside the display device 100.

The near-field communication module unit 114 is a module for near-field communication. For example, bluetooth, RFID ("Radio Frequency Identification"), IrDA ("Infrared Data Association"), UWB ("Ultra Wideband"), or ZigBee may be employed for near-field communication.

The user input unit 120 is provided for input of an audio signal or a video signal. The user input unit 120 may include a camera 121 and a microphone 122. The camera 121 processes an image frame, such as a still image or a motion image, that is acquired by an image sensor in a video call mode or an image capturing mode. The processed image frame may be displayed on a display unit 151.

The image frame processed in the camera 121 may be stored in the memory 160 or may be externally transmitted through the communication unit 110. Depending on the configuration of a terminal, two or more cameras 121 may be provided. The camera 121 may be two-dimensional or three-dimensional imaging camera 121 alone or a combination thereof.

The microphone 122 receives an external sound signal in a call mode, a recoding mode, or a voice recognition mode and converts the sound signal into electrical voice data. The microphone 122 may include various noise-cancelling algorithms for removing noise generated when receiving the external sound signal.

The output unit 150 may include the display unit 151 and a sound output unit 152.

The display unit 151 outputs information processed by the display device 100. For example, the display unit 151 may display a UI ("User Interface") or GUI ("Graphic User Interface") associated with the display device 100. The display unit 151 may be at least one of a LCD ("Liquid Crystal Display"), a TFT-LCD ("Thin Film Transistor-Liquid Crystal Display"), an OLED ("Organic Light-Emitting Diode"), a flexible display, and a three-dimensional display. Some of the above displays may be configured as a transparent or light-transmission type display through which the outside may be viewed. This may be called "transparent display". An example of the transparent display includes a transparent LCD. A rear portion of the display unit 151 may also have a light-transmission structure. Such a structure allows a user to view an object located at an opposite side of the terminal body through a portion which is occupied by the display unit 151.

According to a type of implementing the display device 100, two or more display units 151 may be provided. For example, a plurality of display units 151 may be integrally formed on a surface of the display device 100 or may be arranged on the surface of the display device 100 to be spaced apart from each other. And, the plurality of display units 151 may be arranged on different surfaces of the display device 100.

In a case where the display unit 151 and a sensor sensing a touch operation (hereinafter, referred to as "touch sensor") are mutually layered, the display unit 151 may function as an input device, as well as the output device. The touch sensor may be configured as, for example, a touch film, a touch sheet, and a touch pad.

The touch sensor may be configured to convert a variation in capacitance that occurs at a specific area of the display unit 151 or a pressure exerted to a specific area of the display unit 151 into an electrical input signal. The touch sensor may be configured to sense a pressure when touched as well as the position and area of a touch.

When the touch sensor is touched, a signal corresponding to the touch is transmitted to a touch controller. The touch controller processes the signal to generate corresponding data, and transmits the data to the controller 180. Accordingly, the controller 180 may determine what area of the display unit 151 has been touched.

The sound output unit 152 may output audio data received from the communication unit 110 or stored in the memory 160. The sound output unit 152 may output a sound signal associated with a function performed in the display device 100 (for example, a call signal receiving sound, a message receiving sound, etc.). The sound output unit 152 may include a receiver, a speaker, a buzzer, or the like.

The memory 160 may store a program for operating the controller 180 or preliminarily store input/output data (for example, a phone book, messages, still images, motion images, etc.). The memory 160 may also store data associated with vibrations and sounds of various patterns outputted when the touch screen is touched.

The memory 160 may include at least one storage of a flash memory type memory, a hard disk type memory, a multimedia card micro type memory, a card type memory (for example, SD or XD memory), a RAM ("Random Access Memory"), an SRAM ("Static Random Access Memory"), a ROM ("Read-Only Memory"), an EEPROM ("Electrically Erasable Programmable Read-Only Memory"), a PROM ("Programmable Read-Only Memory"), a magnetic memory, a magnetic disk, and an optical disk. The display device 100 may operate in association with a web storage that performs a storage function of the memory 160 over the Internet.

The interface unit 170 serves as a passage to all the external devices connected to the display device 100. The interface unit 170 receives data or power from an external device and transmits the data or power to each of the components in the display device 100, or allows data from the inside of the display device 100 to the external device. For example, the interface unit 170 may include a wired/wires headset port, an external recharger port, a wired/wireless data port, a memory card port, a port for connecting a device having an identifiable module, an audio I/O ("Input/Output") port, a video I/O port, and an earphone port.

The controller 180 controls the overall operation of the display device. For example, the controller 180 performs control or process associated with voice call, data communication, and video call. The controller 180 may include an image processing unit 182 for image processing. The image processing unit 182 will be described below in greater detail.

The power supply unit 190 receives external or internal power under the control of the controller 180 and supplies power necessary for the operation of each component.

The various embodiments described herein may be implemented as software, hardware, or a combination thereof in a storage medium that may be read by a computer or a similar device thereof. In the case of hardware, the embodiments may be implemented using at least one of ASICs ("Application Specific Integrated Circuits"), DSPs ("Digital Signal Processors"), DSPDs ("Digital Signal Processing Devices"), PLDs ("Programmable Logic Devices"), FPGAs ("Field Programmable Gate Arrays"), processors, controllers, micro-controllers, microprocessors, and electrical units for performing functions. Some of the embodiments may be implemented by the controller 180.

In the case of software, some embodiments related to procedures or functions may be implemented together with a separate software module that performs at least one function or operation. A software code may be implemented by a software application written in a programming language. Further, the software code may be stored in the memory 160 and executed by the controller 180.

Figure 2:
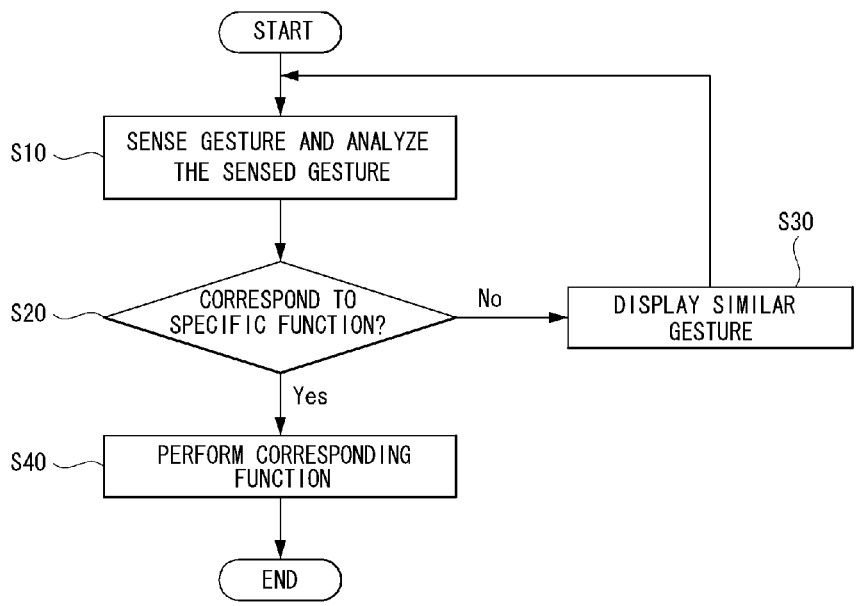
FIG. 2 is a flowchart illustrating an operation of a display device according to an embodiment of the present invention.

FIG. 2 is a flowchart illustrating an operation of a display device according to an embodiment of the present invention.

Referring to FIG. 2, a display device 100 according to an embodiment of the present invention may include the step of sensing and analyzing a gesture (S10).

The gesture means user's action to express emotion or information with a part of his/her body other than voice. For example, such a gesture may include user's moving from a first position to a second position, twisting his/her body, or making a specific shape with his/her arms or legs. Since voice is excluded from the gesture, the gesture may be sensed by the camera 121.

The camera 121 may be integrally provided with the display device 100 to capture user's gesture, or provided separately from the display device 100 to transmit a captured image of the gesture to the display device 100. The camera 121 may be a two-dimensional or tree-dimensional camera, or a combination of a two-dimensional cameral and a three-dimensional camera. Further, although a single camera 121 is shown in the figures for ease of description, a plurality of cameras 121 may be provided.

In a case where the camera 121 is a three-dimensional camera that may capture a three-dimensional image, the camera 121 may be a stereo camera or a TOF ("Time of Flight") camera.

The stereo camera may obtain a stereoscopic image using two imaging lenses that are provided to be spaced apart from each other. The two lenses interact with each other in regard to the focus and exposure. The parallax of the two lenses allows an object to be viewed in 3D.

The TOF camera may obtain a stereoscopic image by measuring time taken for a light beam reflected by an object to be returned. Specifically, when a distance between the object and the camera is long, the travelling time of light beam is increased, and when the distance is short, the travelling time is decreased. Accordingly, the distance may be calculated by measuring the travelling time, and an stereoscopic image can be obtained using the measured distance. The TOF camera may include a camera that illuminates the object with the light beam.

When user's gesture is sensed by the camera 121, the sensed gesture may be analyzed. The user's gesture itself captured by the camera 121 is merely an image signal. Accordingly, the user's gesture included in the captured image needs to be analyzed so that the meaning of the gesture may be interpreted by the controller 180 of the display device 100. As a pre-treatment step for interpretation of the gesture by the controller 180, the sensed gesture needs to be analyzed. The sensed gesture may be subjected to a predetermined pre-treatment process in the image processing unit 182 before analysis.

The image processing unit 182 may determine which portion of the captured image by the camera 121 corresponds to the user's gesture. Various image processing methods by the image processing unit 182 may be provided, and an example thereof may include a method of sensing user's skin tone. Skin color of human face and hands is generally exposed to the outside, and human eyes generally have a dark tone. User's face may be sensed through these unique color patterns. A skin-colored object that is relatively freely moved within a predetermined radius of a face and has smaller size than the face may be treated as a hand. In the case of a hand, a case of making a first may be displayed to have a lower skin tone than a case of opening the hand. Further, a case where skin-colored portions and non skin-colored portions are alternately existent in an area recognized as a hand may be considered that the fingers are open. As such, the image processing unit 182 may process an image in a method of extracting a few features from the image as described above.

The image processing unit 182 itself or the controller 180 may analyze whether the image processed by the image processing unit 182 is a gesture corresponding to a specific function.

Various means may be provided to manipulate the display device 100. For example, a button included in the display device 100 may be pressed to let the display device 100 perform a specific function. Further, a button included in a remote controller may be pressed to remotely control the display device 100. In addition, the display device 100 may also be manipulated by user's making a specific gesture. For example, when the user makes a predetermined gesture, the camera 121 may capture an image including the gesture, and the image processing unit 182 may process the captured image and extract the gesture from the captured image. The gesture extracted by the image processing unit 182 may be recognized to correspond to a specific function by the image processing unit 182 itself or the controller 180. When the gesture is recognized to correspond to the specific function, the function may be performed. Manipulation of the display device 100 by a gesture allows the display device 100 to be easily manipulated compared to manipulating the display device 100 itself or using the remote controller. The display device 100 may be manipulated by a gesture so that the convenience of use of the display device 100 may be increased.

It is determined whether the analyzed gesture corresponds to a specific function (S20), and if so, the function is performed (S40).

If the gesture does not correspond to the specific function, a gesture similar to the user's current gesture may be displayed (S40).

The user's gesture does not always match a predetermined gesture. For example, there might be a case where a gesture is not normally made due to a poor gesture manipulation of the display device 100 or careless manipulation. Even in this case, it may seem that the user intended to let the display device 100 perform a function. Accordingly, when a wrong gesture is entered, it might be proper to compare the entered gesture with a preset gesture to allow the user to make a right gesture rather than to disregard the entered gesture without any reaction. Even when the user makes a wrong gesture, the display device 100 may guide the user to make a right gesture by displaying a gesture similar to the wrong gesture.

Figure 3:
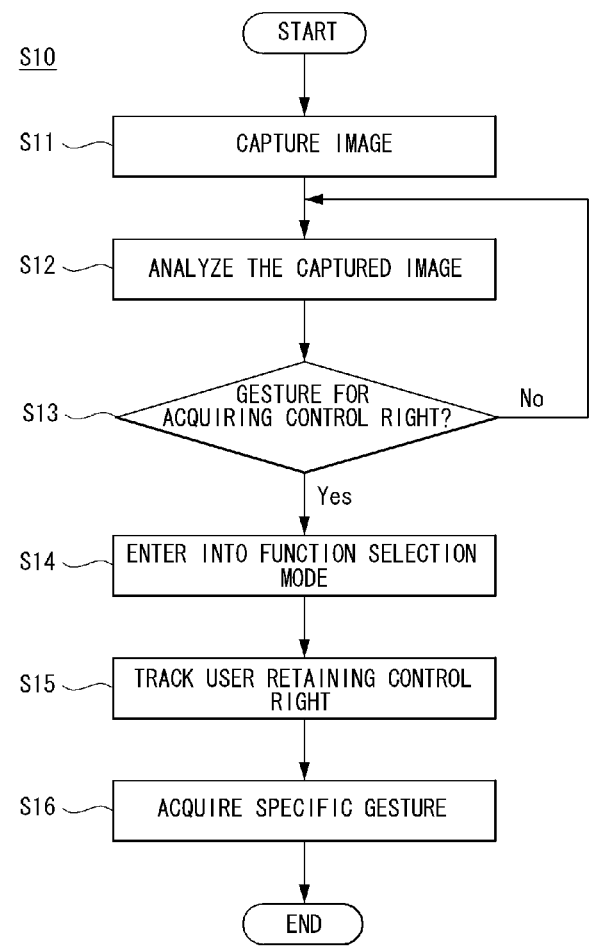
FIG. 3 is a flowchart illustrating more specifically the step of sensing a gesture and analyzing the sensed gesture shown in FIG. 2.
Figure 4:
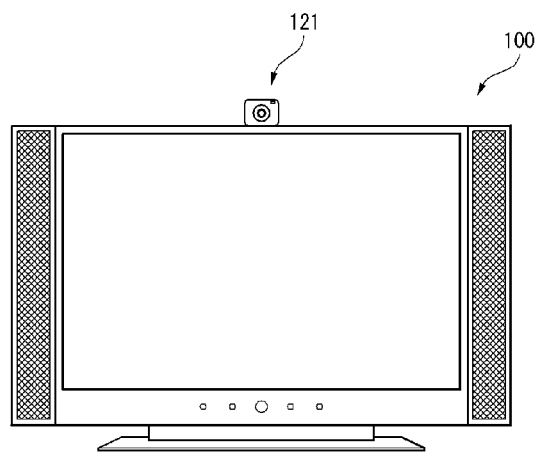
FIG. 4 is a view illustrating a process of obtaining a control right on the display device shown in FIG. 1.
Figure 4:
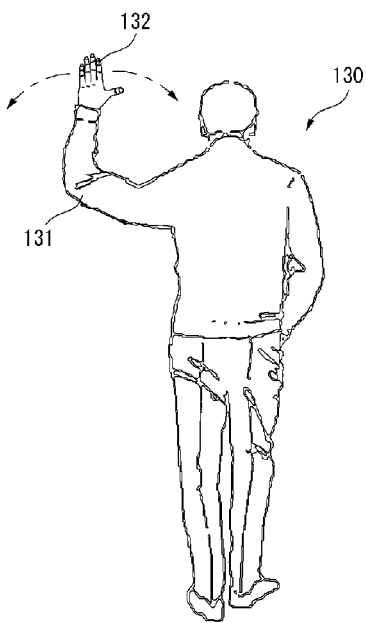
Figure 5:
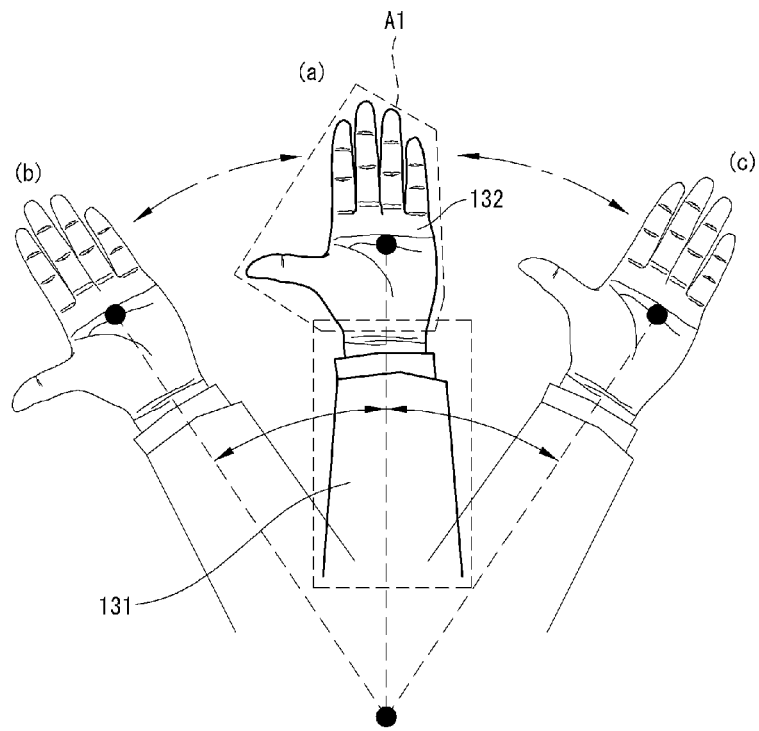
FIG. 5 is a flowchart illustrating more specifically the process of obtaining a control right shown in FIG. 4.
Figure 6:
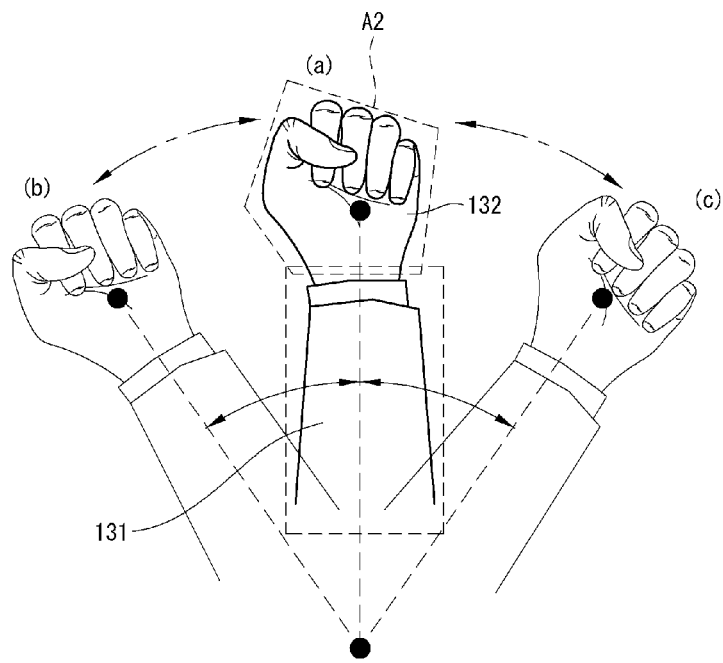
FIG. 6 is a view illustrating a process of obtaining a control right according to an embodiment of the present invention.
Figure 7:
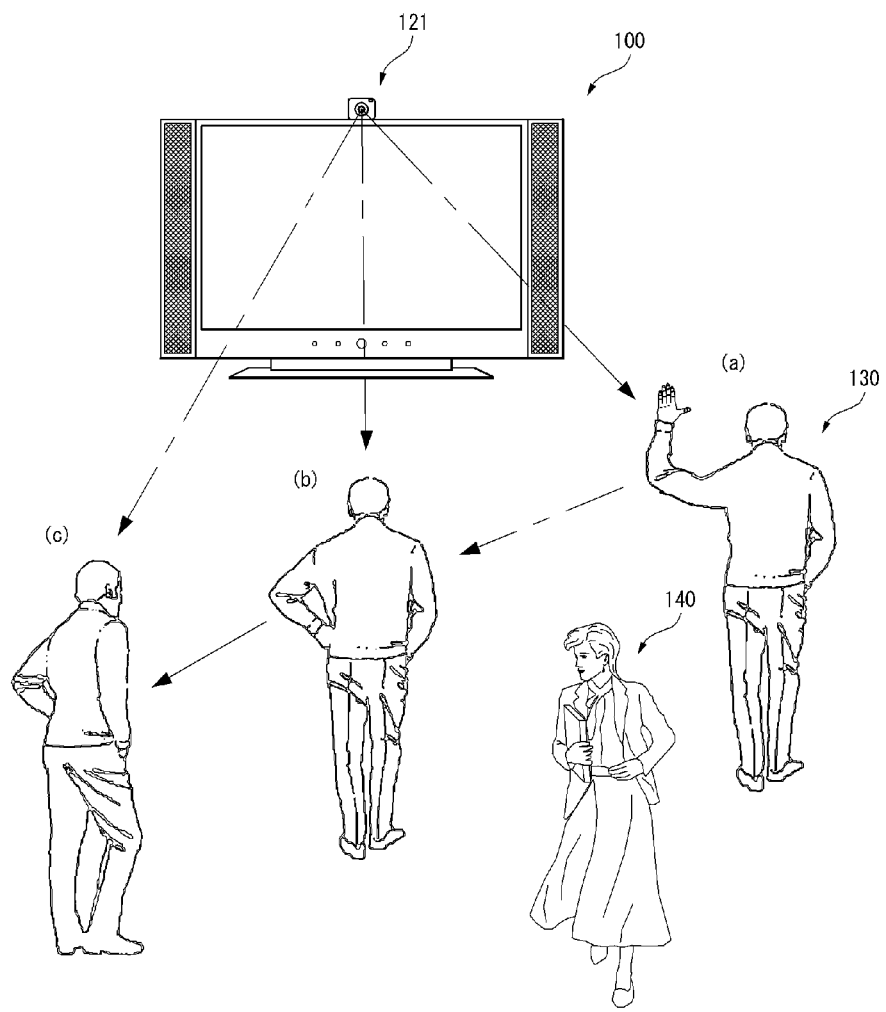
FIG. 7 is a view illustrating a process of tracking a user retaining a control right.

FIG. 3 is a flowchart illustrating more specifically the step of sensing a gesture and analyzing the sensed gesture shown in FIG. 2, FIG. 4 is a view illustrating a process of obtaining a control right on the display device shown in FIG. 1, FIG. 5 is a flowchart illustrating more specifically the process of obtaining a control right shown in FIG. 4, FIG. 6 is a view illustrating a process of obtaining a control right according to an embodiment of the present invention, and FIG. 7 is a view illustrating a process of tracking a user retaining a control right.

Referring to FIGS. 3 through 7, the gesture analysis step (S10 of FIG. 2) may include the steps of capturing an image including user's gesture (S11) and analyzing the captured image (S12).

The capturing step and analyzing step have been already described above.

After the analysis of the image, it may be determined whether the user's gesture is an action to acquire a control right (S13).

While manipulating the display device 100 by a gesture, it needs to be notified to the display device 100 that the user has an intention to manipulate the display device 100. For example, it may be notified to the display device 100 that a specific order may be issued to the display device 100 since a predetermined gesture is made to the display device 100, so that the display device 100 may be read to perform a function. Hereinafter, this gesture will be referred to as "acquisition of a control right on the display device 100".

By having the display device 100 stand by for user command through the gesture that acquires a control right to perform a specific function of the display device 100, the display device 100 may be prevented from being unintentionally operated. The camera 121 may keep capturing the user in a room. When the user makes a predetermined gesture, a control right is issued to the user. A gesture may be inputted more precisely by focusing on the user who received the control right. Receiving the control right may be compared to taking over a remote controller. Just as a user grabbing a remote controller may manipulate the display device 100, so a user who receives the control right may manipulate the display device 100.

As shown in FIG. 4, the user 130 may take action of waving his left arm, with his left hand open and an lower portion of the left arm lifted up. Hereinafter, this action is referred to as "first gesture". The first gesture may be preset as an action to issue a control right to the user 130 between the display device 100 and the user 130.

FIG. 5 illustrates a process of analyzing an image captured by the camera 121 in the image processing unit 182. For example, user's left arm may be recognized as a lower portion 131 shaped as a long cylinder and an opened left hand 132 shaped as a pentagon. When the left hand 132 is opened, a first area A1 shaped as a pentagon may be formed by a thumb and the other fingers. Further, it may be recognized that a virtual operation point is existent at a center of the first area A1 and a predetermined position of the lower portion 131. The operation point may be a joint of the user. If user's joint is the operation point, user's gesture may be recognized by observing the user with respect to the operation point. For example, user's gesture may be analyzed by observing a phenomenon that an operation point is moved left and right with respect to another operation point or a distance between two operation points is varied.

As shown in FIG. 6, a gesture of acquiring a control right may be set in various manners. Referring to FIG. 6, when the user waves his first left and right, the display device 100 may allow the user to have a control right. Contrary to a case where the user opens the left hand 132, when the user makes a first, a second area A2 formed by the first may be different from the first area (A1 of FIG. 1). For example, the second area A2 may be smaller than the first area (A1 of FIG. 1), and a pentagonal shape of the second area A2 may be different from a pentagonal shape of the first area (A1 of FIG. 1).

Even in this case, however, as described above, the gesture may be determined by analyzing a relationship between a few operation points.

If it is determined whether the user's gesture is an action to acquire a control right (S13) and the control right is issued to the user, then a step of entering into a function selection mode may proceed (S14).

The phrase "user 130 makes a gesture to obtain a control right" means that the user 130 intends to have a specific manipulation on the display device 100. Accordingly, while the control right is provided to the user 130, the display device 100 may enter into the function selection mode that stands by for a function selection.

When entering into the function selection mode, a step of tracking the user 130 who had acquired the control right may proceed (S15).

A plurality of people may be in a place where the display device 100 is installed. Accordingly, the display device 100 needs to determine which people has the control right. Further, when the user 130 who retains the control right moves from a first position to a second position, the display device 100 also needs to track the moving user 130 so that the control right may be maintained.

As shown in FIG. 7, another user 140 may be in a space where the display device 100 is installed besides the user 130. When the user 130 takes action of acquiring the control right at position (a), the camera 121 tracks the user 130 so that the user 130 may maintain the control right even when moving to position (b) or (c). On the other hand, in cases where the user 130 retaining the control right makes a gesture of waiving the control right, makes no further gesture for function selection during a predetermined time, or moves off a predetermined range, the control right may be deprived. Further, the control right may also be simultaneously issued to a plurality of people.

A step of obtaining a specific gesture made by the user 130 while tracking the user 130 retaining the control right may proceed (S16).

The specific gesture may be an action previously promised between the display device 100 and the user 130. Hereinafter, the step S16 of obtaining the specific gesture will be described in greater detail with FIG. 8 and relevant figures.

Figure 8:
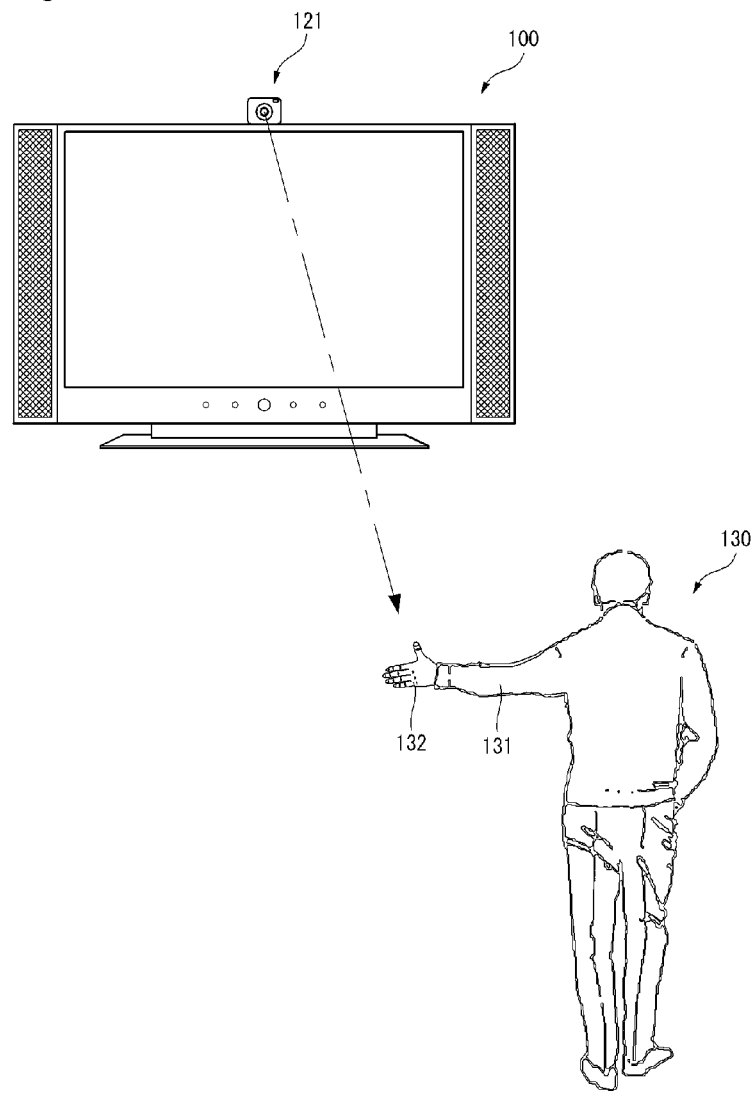
FIGS. 8 and 9 are views illustrating a process of obtaining a specific gesture.
Figure 9:
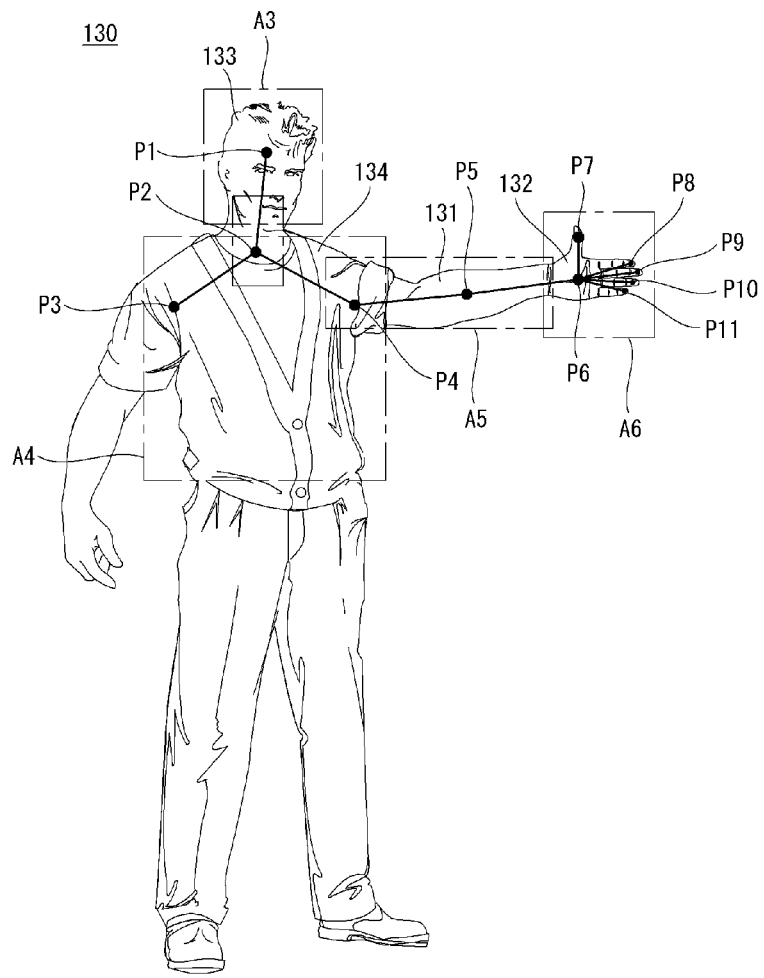
Figure 10:
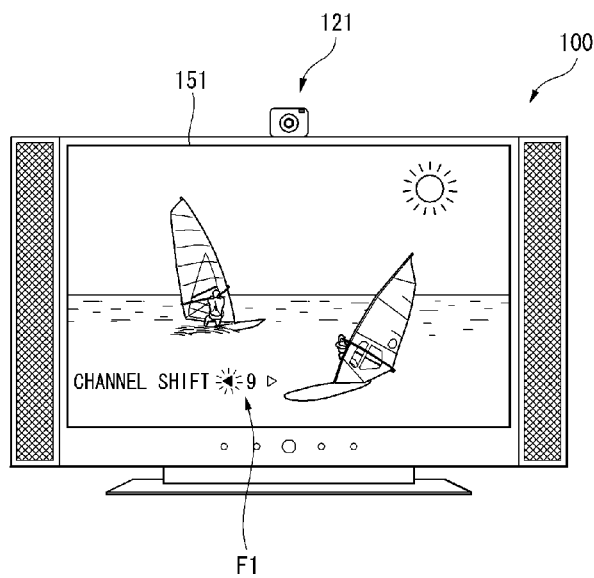
FIG. 10 is a view illustrating an operation of a display device according to the specific gesture shown in FIGS. 8 and 9.

FIGS. 8 and 9 are views illustrating a process of acquiring a specific gesture, and FIG. 10 is a view illustrating the operation of the display device according to the specific gesture shown in FIGS. 8 and 9.

As shown in FIG. 8, the user 130 may open the left hand 132 while simultaneously extending his left arm. Since the user 130 retains the control right on the display device 100 as described above, the camera 121 may track the user 130.

FIG. 9 illustrates an image captured by the camera.

As shown in FIG. 9, the user 130 making a gesture may be divided into three to sixth areas A3 to A6. For example, the third area A3 may be user's head 133, the fourth area A4 may be user's body 134, the fifth area A5 may be the lower portion 131, and the sixth area A6 may be the left hand 132. The user's gesture may be recognized through several operation points.

The first to eleventh operation points P1 to P11 may be reference points that allow the user's gesture to be recognized. The first operation point P1 may correspond to the head 133, the second operation point P2 to user's neck, the third operation point P3 to user's right shoulder, the fourth operation point P4 to user's left shoulder, the fifth operation point P5 to user's elbow, the sixth operation point P6 to user's palm, and the seventh to eleventh operation points P7 to P11 to user's fingers, respectively. As a distance between the fourth operation point P4 and the sixth operation point P6 increases and a line connecting the fourth to sixth operation points P4 to P6 becomes close to a straight line, it may be recognized to extend the arm. Further, as a distance between the sixth operation point P6 and the seventh to eleventh operation points P7 to P11 increases, it may be recognized to open the hand. As such, if a distance between two operation points and a relative position are known, the gesture maybe acquired without a process of modeling the user all over. Accordingly, a desired result may be achieved without exposing the image processing unit 182 itself or the controller 180 to an excessive load.

When the user 130 takes action of horizontally extending his left arm, a channel shift function F1 may be performed as shown in FIG. 10.

Figure 11:
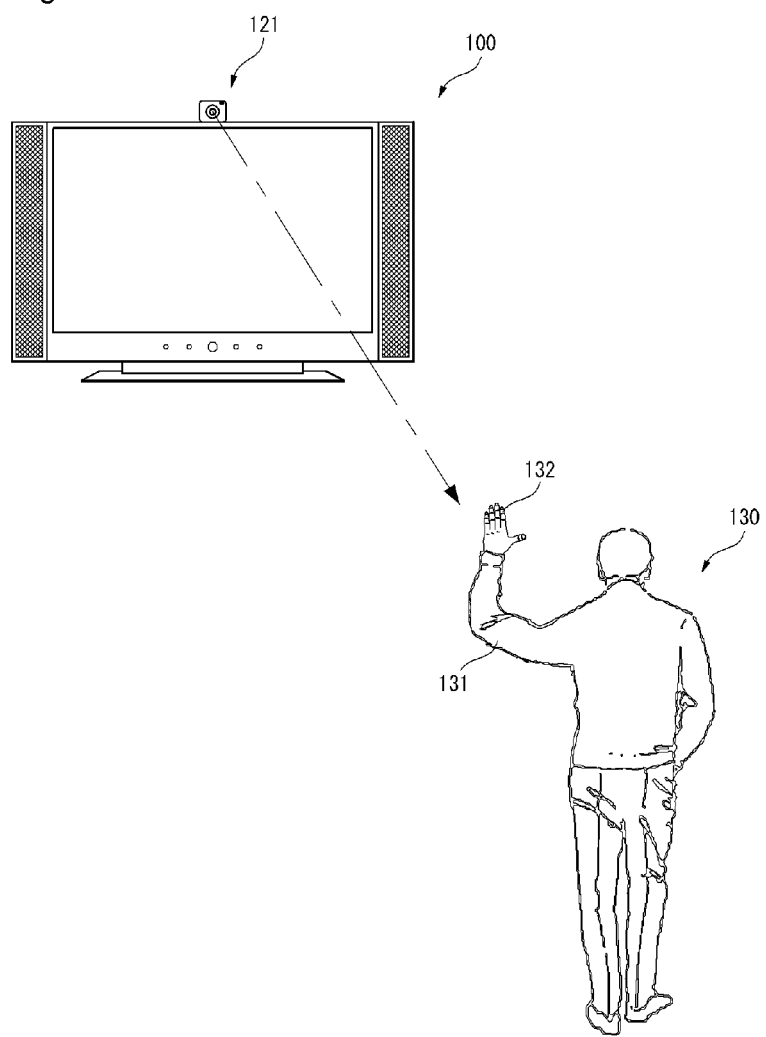
FIGS. 11 and 12 are a view illustrating a process of obtaining a specific gesture.
Figure 12:
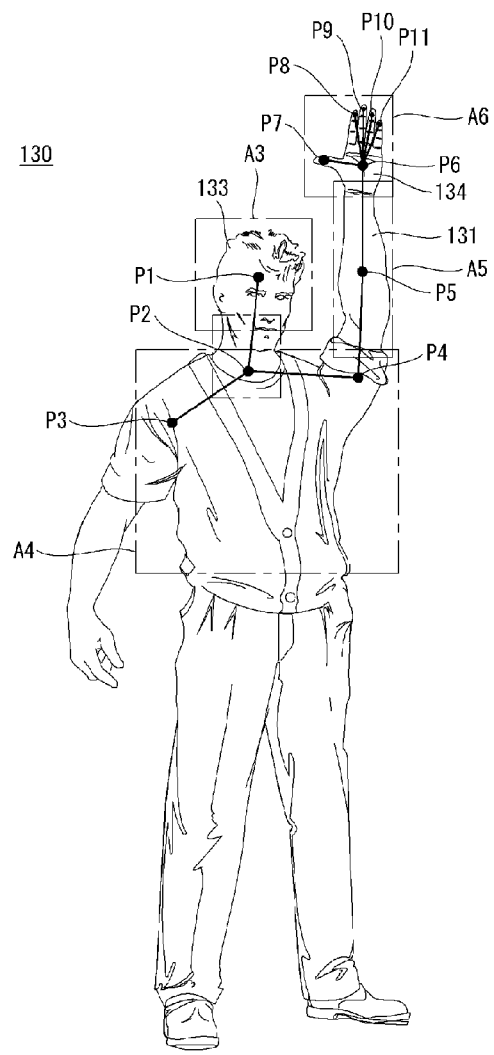
Figure 13:
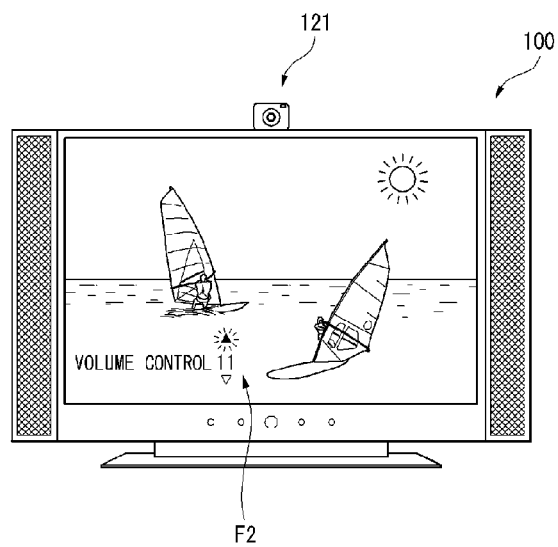
FIG. 13 is a view illustrating an operation of a display device according to the specific gesture shown in FIGS. 11 and 12.

FIGS. 11 and 12 are views illustrating a process of acquiring a specific gesture, and FIG. 13 is a view illustrating an operation of the display device according to the specific gesture shown in FIGS. 11 and 12.

As shown in FIG. 11, the user 130 retaining the control right may make a gesture of lifting the lower portion 131 with the left hand 132 open. An image including the user's gesture may be captured by the camera 121.

FIG. 12 illustrates the image captured by the camera 121. As shown in FIG. 12, the user's current gesture may be known by a relative position of each of operation points corresponding to each portion of the user 130. For example, as an angle between a line connecting between the second operation point P2 and the fourth operation point P4 and a line connecting the fourth operation point P4, the fifth operation point P5, and the sixth operation point P6 becomes close to a right angle, and a line connecting the fourth to sixth operation points P4 to P6 becomes close to a straight line, it may be determined that the user 130 extends his left arm in an upper direction.

When the user 130 takes action of extending his left hand in the upper direction, a volume control function F2 may be performed as shown in FIG. 13.

Figure 14:
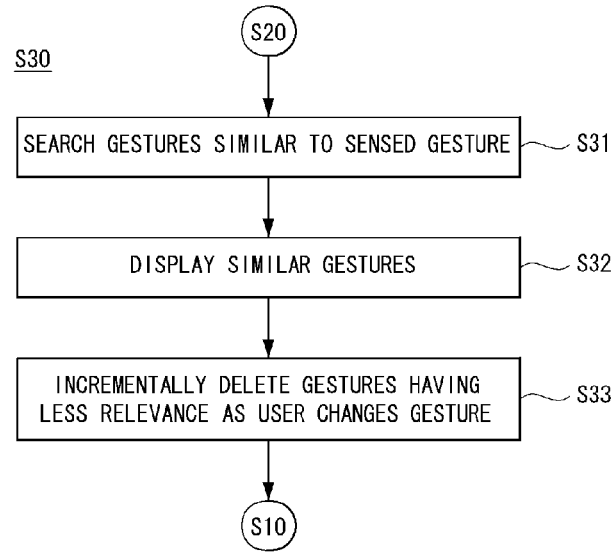
FIG. 14 is a flowchart illustrating the step of performing a corresponding function shown in FIG. 2.

FIG. 14 is a flowchart illustrating more specifically the step of performing a corresponding function shown in FIG. 2.

As shown in FIG. 14, the step of displaying a similar gesture (S30 of FIG. 2) may include a step of searching a gesture similar to a sensed gesture (S31).

The user's gesture may be inaccurate for various reasons. For example, although an inaccurate gesture is entered, it may be considered that the user 130 retaining the control right has an intention to manipulate the display device 100. Accordingly, even when the inaccurate gesture is entered by the user 130, a proper gesture may be introduced without disregarding such entry. This allows for a user-friendly manipulation environment. For this purpose, among gestures stored in the memory (160 of FIG. 1), a gesture similar to the user's gesture may be searched.

When the similar gesture is searched, a step of displaying the searched similar gesture may proceed (S32).

By displaying the similar gesture on the display unit 151, the user may visually recognize it and thus have a chance to correct his gesture.

A step of incrementally deleting gestures having less relevance as the user changes his gesture may proceed (S33).

The user 130 may compare his actual gesture with the similar gesture displayed on the display unit 151 and correct his gesture to perform a desired specific function. As the user 130 corrects his gesture, the gesture may gradually become close to a gesture corresponding to the specific function.

Accordingly, the less-relevant gestures may be excluded from display one by one to prevent user's confusion and notify the user that the makes a right correction of the gesture.

Hereinafter, the above steps will be described in greater detail with reference to the relevant figures.

Figure 15:
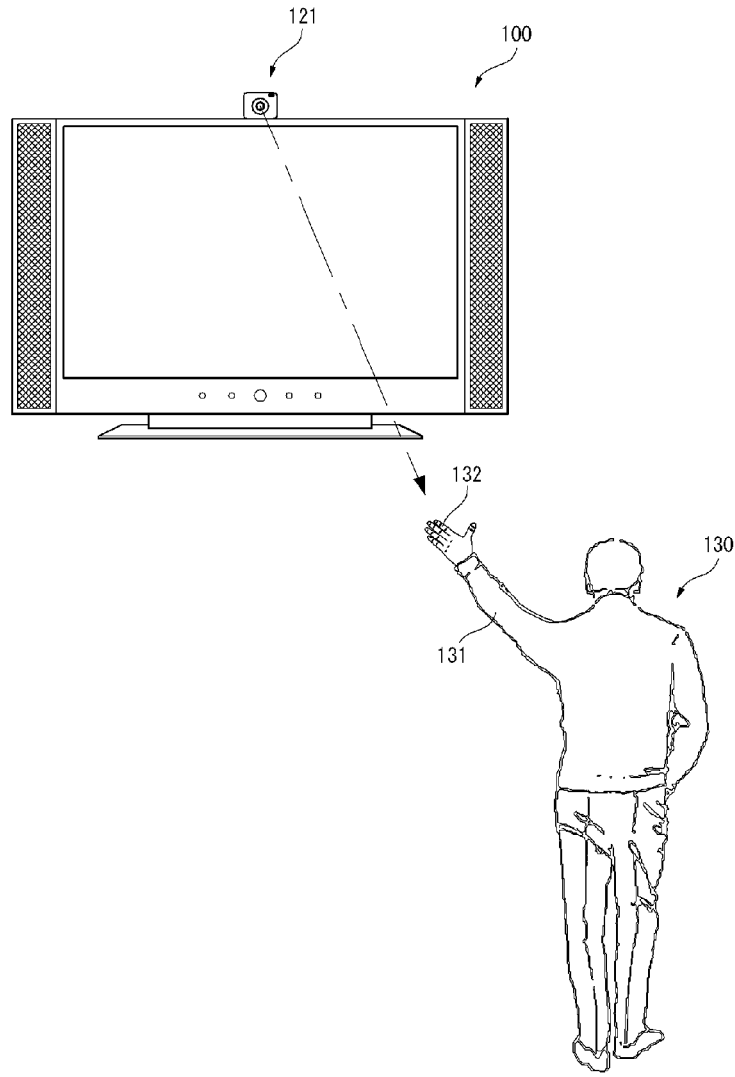
FIGS. 15 to 17 are views illustrating a process of obtaining a specific gesture.
Figure 16:
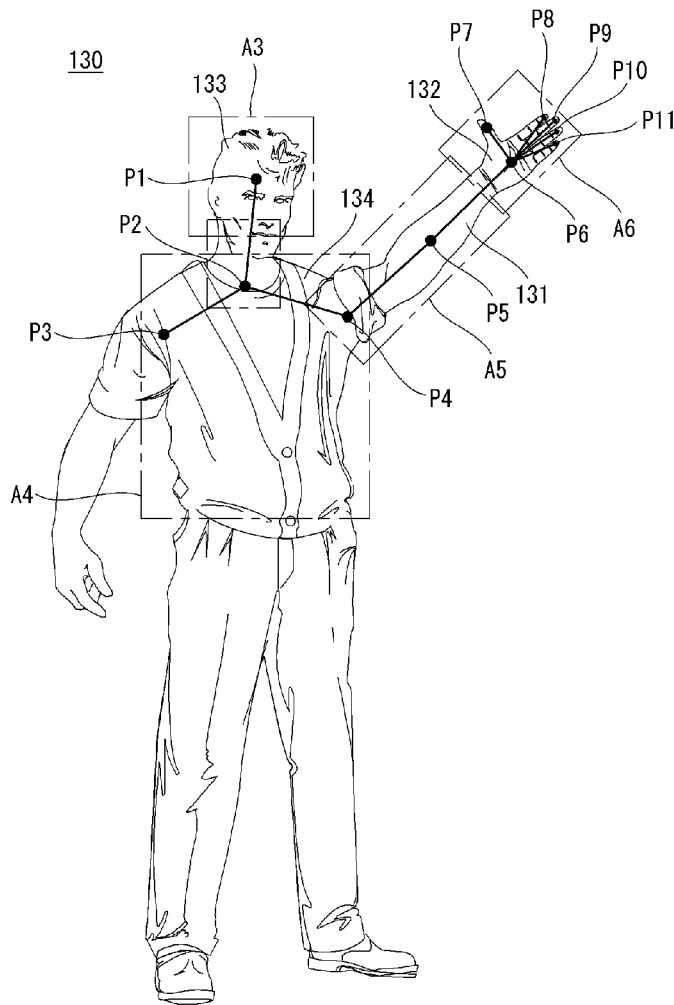
Figure 17:
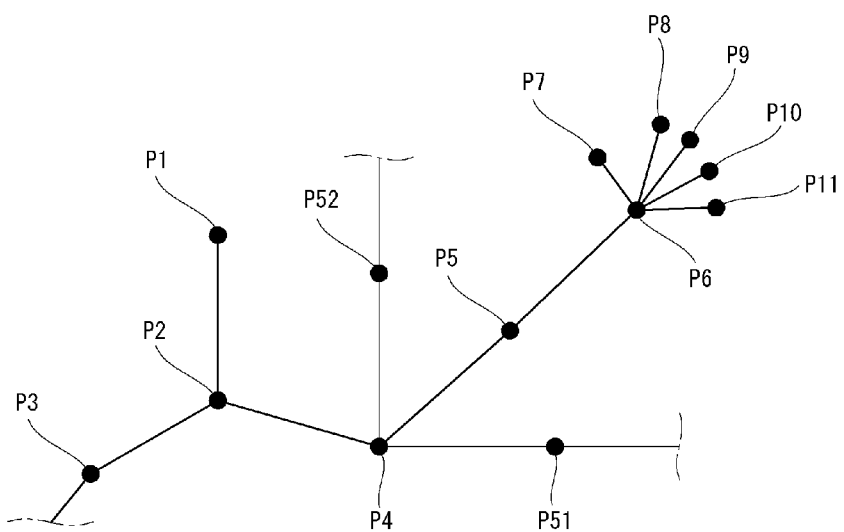

FIGS. 15 to 17 are views illustrating a process of acquiring a specific gesture.

As shown in FIG. 15, the user 130 retaining the control right may make a gesture of inclinedly lifting the lower portion 131 with his left hand 132 open.

As shown in FIG. 16, it may be recognized by the controller (180 of FIG. 1) that an angle between a line connecting between the second operation point P2 and the fourth operation point P4 and a line connecting the fourth to sixth operation points P4 to P6 is not 90 degrees or 180 degrees but becomes close to 45 degrees.

As shown in FIG. 17, the user's gesture may be configured as the first to eleventh operation points P1 to P11. Considering a relative position with the fifth operation point P5, it can be seen that the position of a fifty second operation point P52 corresponds to a case where the user extends his left arm in an upper direction and the position of a fifty first operation point P51 corresponds to a case where the user horizontally extends his left arm. Accordingly, it can be analyzed by the controller (180 of FIG. 1) that the user 130 currently extends his left arm in a direction that is neither horizontal nor perpendicular direction.

Figure 18:
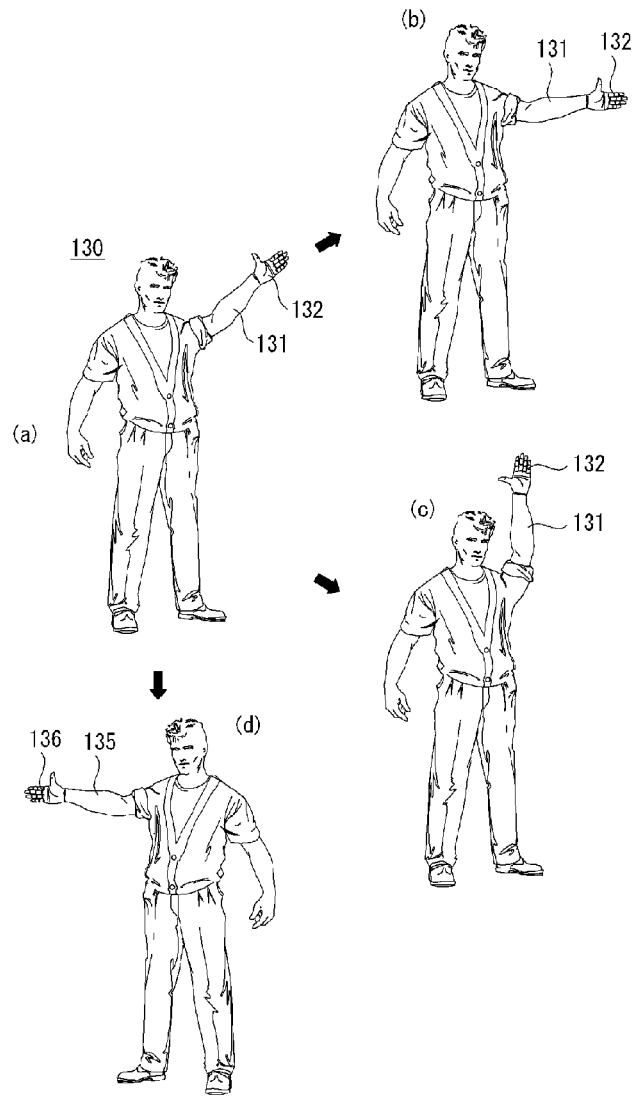
FIG. 18 is a view illustrating a gesture similar to or different from the specific gesture shown in FIGS. 15 to 17.

As shown in FIG. 18A, the user 130 may make a gesture of lifting his left arm in an inclined upper direction. Such a gesture may be determined to be similar to a gesture of lifting the left arm in a horizontal direction as shown in FIG. 18B or a gesture of lifting the left arm in a perpendicular direction as shown in FIG. 18C. However, as shown in FIG. 18D, a gesture of lifting not left arm but right arm in the horizontal direction may not be recognized to be similar to the gesture as shown in FIG. 18A.

Figure 19:
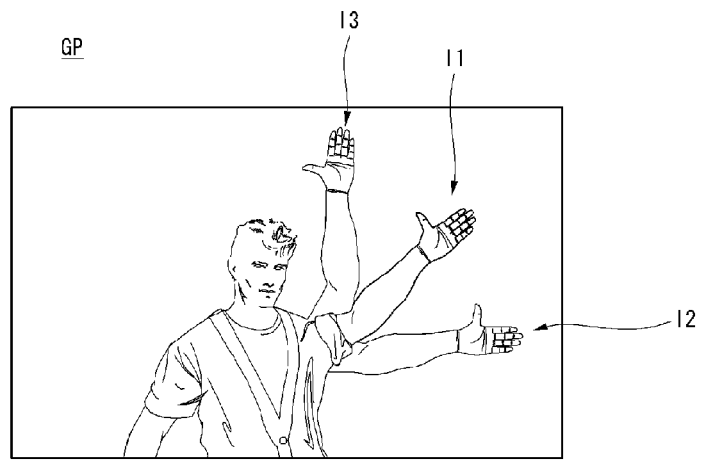
FIG. 19 is a view illustrating a guide popup window displaying an obtained gesture and an exemplary action.

FIG. 19 is a view illustrating a guide popup window for showing an acquired gesture and an exemplary gesture.

As shown in FIG. 19, the guide popup window GP may display user's first gesture image I1 regarding a gesture the user currently makes and second and third gesture images I2 and I3 that are similar to the first gesture image I1.

Figure 20:
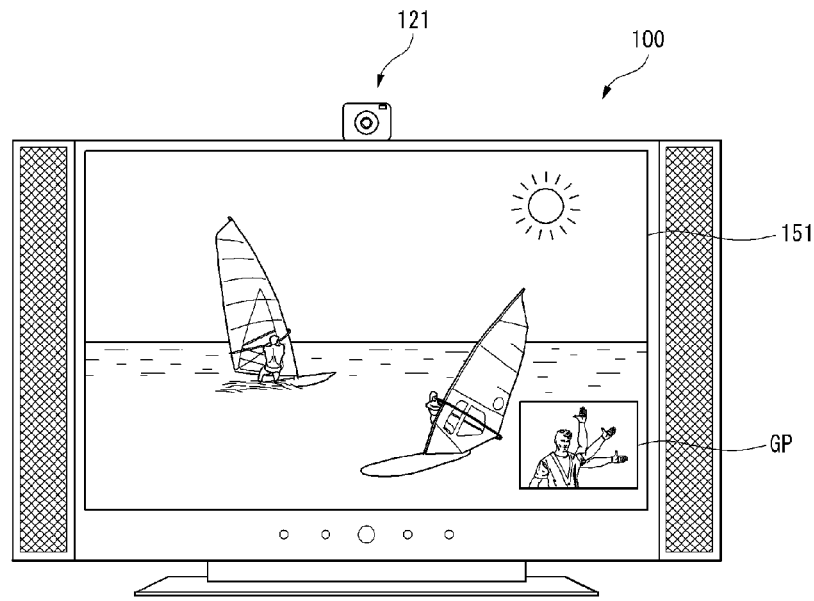
FIG. 20 is a view illustrating a display device displaying the guide popup window shown in FIG. 19.

As shown in FIG. 20, the guide popup window GP may be displayed on the display unit 151. Since the guide popup window GP is partially displayed on the display unit 151, the guide popup window GP does not interfere with user's watching TV. Further, the position or size of the guide popup window GP may be properly changed depending on user's selection.

Figure 21:
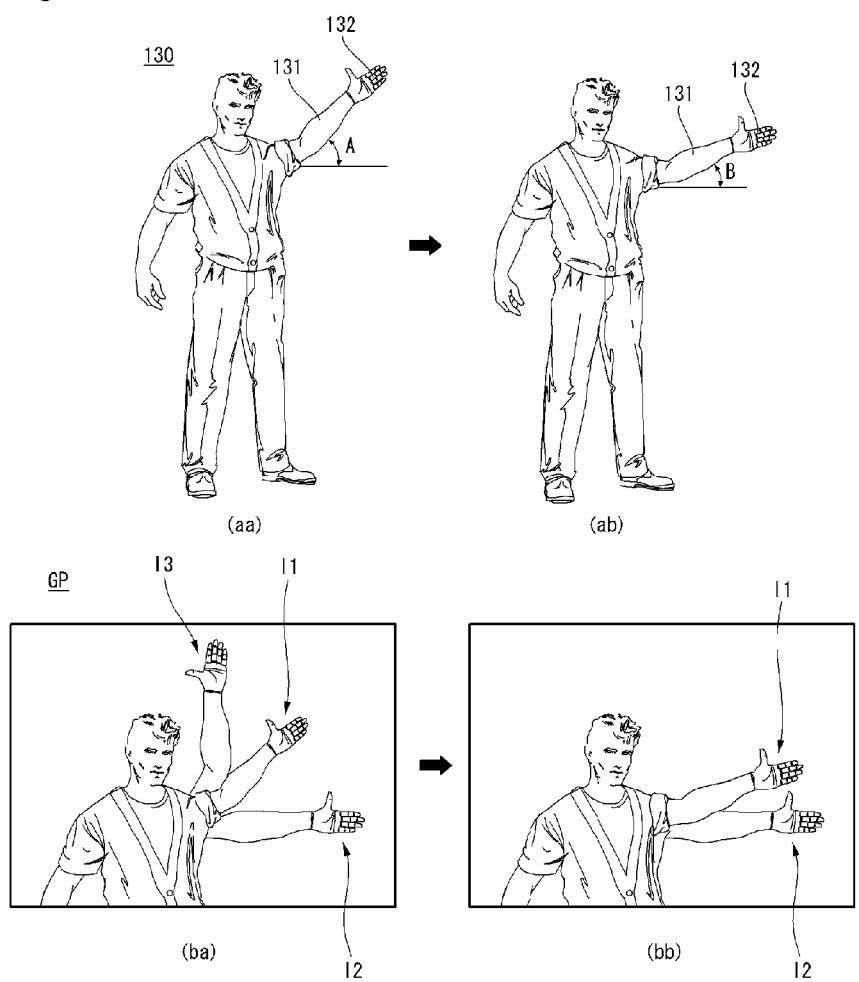
FIG. 21 is a view illustrating that display of a guide popup window is changed depending on user's action.

FIG. 21 is a view illustrating that the display of guide popup window is changed depending on user's action.

As shown in FIG. 21, an image displayed on the guide popup window GP may be actively changed as user's gesture varies.

As shown in (aa) of FIG. 21, the user 130 may make a gesture of lifting his arm at an angle A from the horizontal direction. In such a case, the guide popup window GP may display the user's first gesture image I1 and second and third gesture images I2 and I3 similar to the first gesture image I1. The shape of user's arm displayed by the second and third gesture images I2 and I3 may be displayed at a proper position where user's arm is expected to be positioned.

As shown in FIG. 21BA, when the second and third gesture images I2 and I3 are displayed, the user 130 may correct his pose to make a gesture corresponding to his intended function as shown in (ab) of FIG. 21. For example, the user 130 may correct the angle of his arm from angle A to angle B referring to the image displayed on the guide popup window GP.

If the user 130 corrects his pose, the third gesture image I3 having less relevance may be excluded from display as shown in (bb) of FIG. 21. By deleting other images having less relevance, the user's pose may be corrected to make a right gesture.

Figure 22:
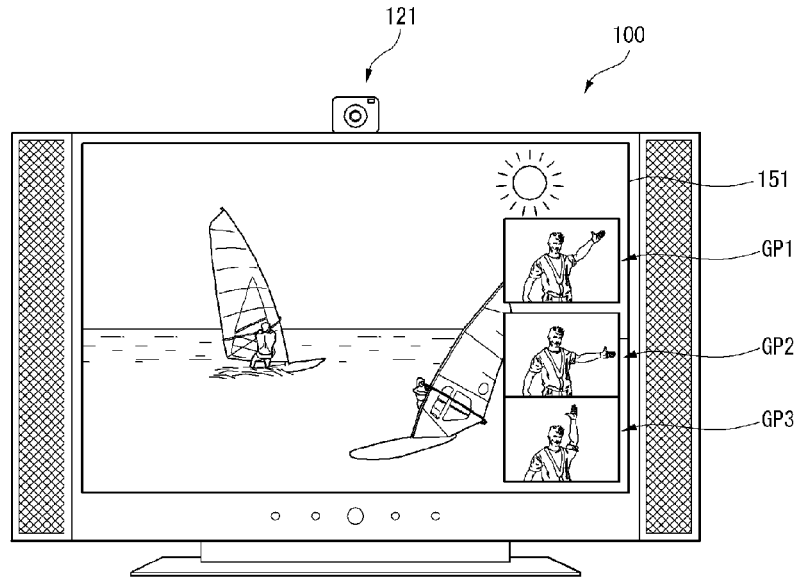
FIG. 22 is a view illustrating a guide popup window displayed on a display device.

FIG. 22 is a view illustrating a guide popup window displayed on the display device according to an embodiment of the present invention.

As shown in FIG. 22, first to third guide popup windows GP1 to GP3 may be displayed on the display unit 151.

The first guide popup window GP1 may display a user's gesture that the user 130 currently makes, and the second and third guide popup windows GP2 and GP3 may display gestures determined to be similar to the user's gesture.

Figure 23:
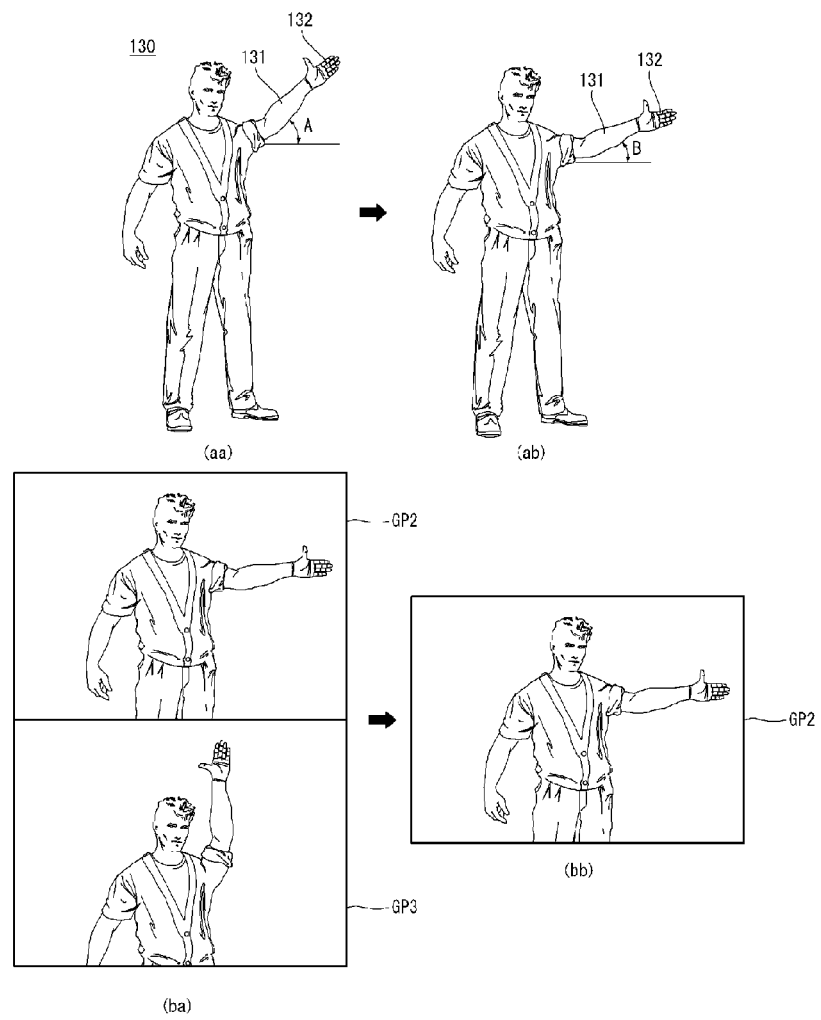
FIG. 23 is a view illustrating that display of a guide popup window is changed depending on user's action.

FIG. 23 is a view illustrating that the display of the guide popup windows is changed as the user's action varies.

As the user 130 corrects his pose from angle A to angle B, as shown in (aa) and (ab) of FIG. 23, the third guide popup window GP3 having less relevance may be excluded from display as shown in (ba) and (bb) of FIG. 23.

Figure 24:
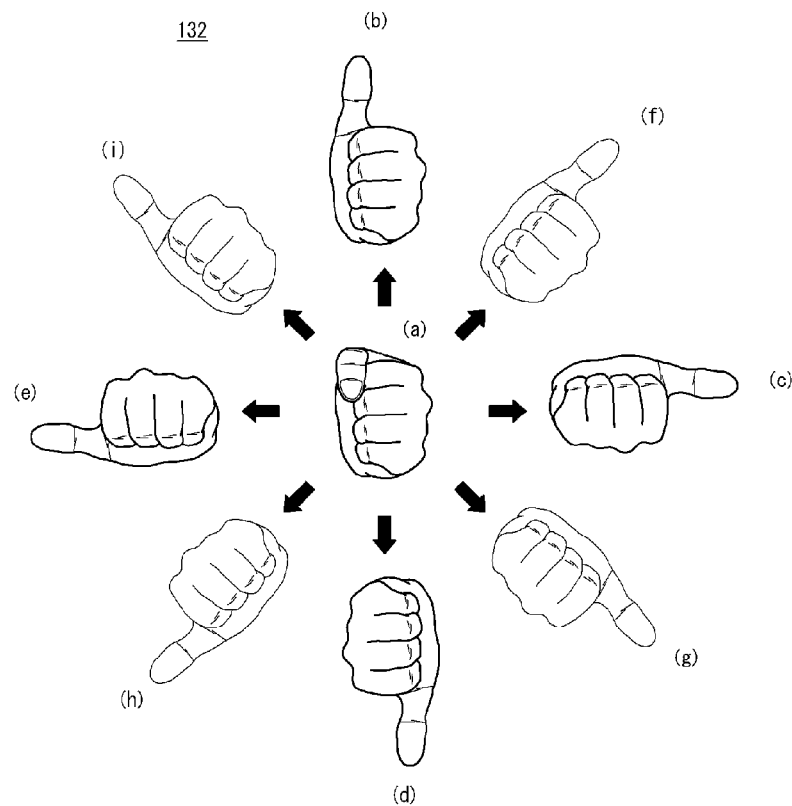
FIG. 24 is a view illustrating a gesture according to an embodiment of the present invention.
Figure 25:
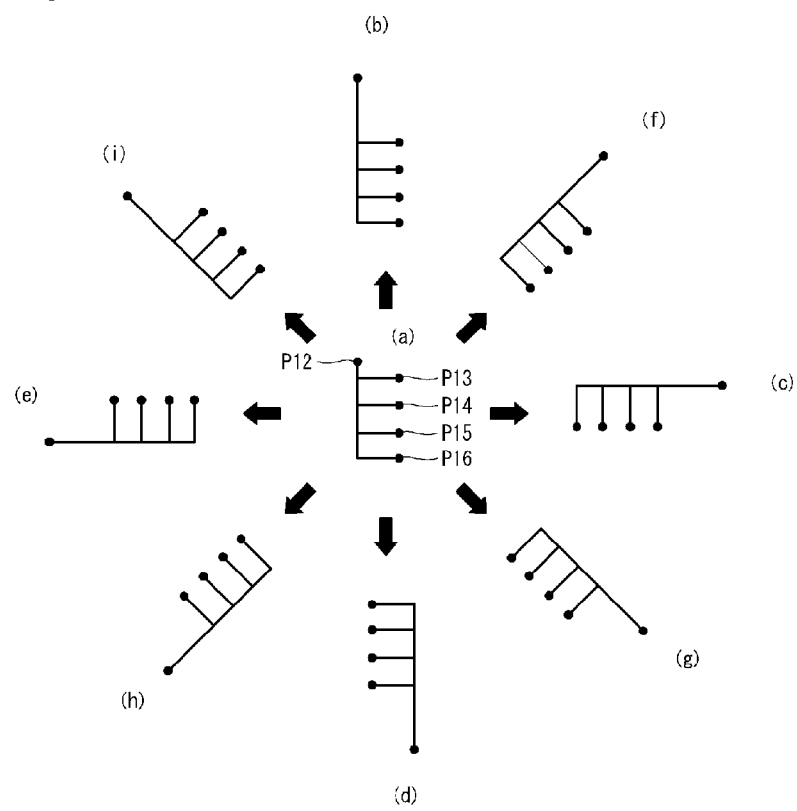
FIG. 25 is a view illustrating a process of recognizing the gesture shown in FIG. 24.
Figure 26:
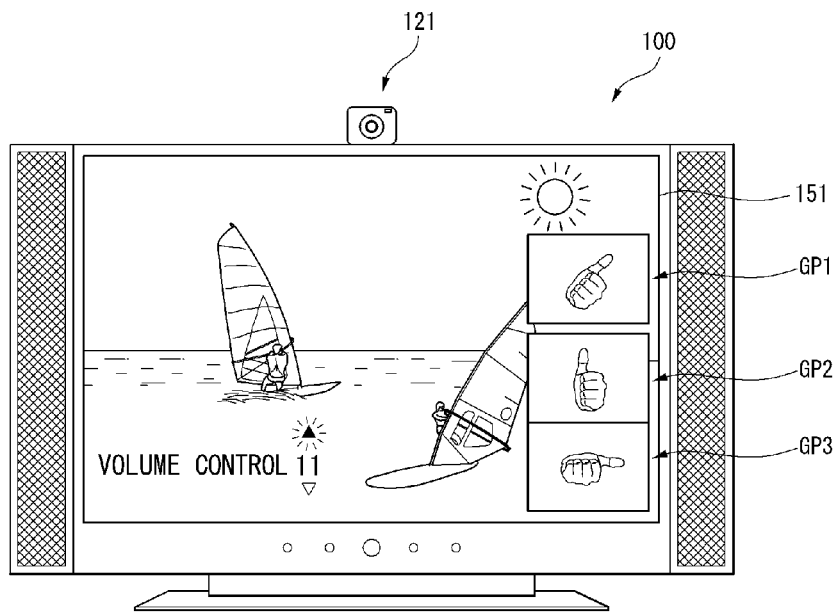
FIG. 26 is a view illustrating a guide popup window displayed on a display device according to the gesture shown in FIG. 24.

FIG. 24 is a view illustrating a gesture according to an embodiment of the present invention, and FIG. 25 is a view illustrating a process of recognizing the gesture shown in FIG. 24.

As shown in FIG. 24, the user 130 may have a control right by taking action A of making a first with his left hand toward the camera (121 of FIG. 1). After the control right is acquired, a specific function may be performed by moving his thumb in upper, lower, left, and right directions ((b), (c), (d), and (e)).

As shown in FIG. 25, the five fingers of the left hand 132 from the thumb to the little finger may correspond to the twelfth to sixteenth operation points P12 to P16. The controller (180 of FIG. 1) may determine whether the thumb is open or not by comparing distances between the twelfth operation point P12 corresponding to the thumb and the other fingers. Further, the direction of the hand may be determined through an angle between the twelfth to sixteenth operation points P12 to P16 and the horizontal direction.

A case where the thumb is positioned in upper, lower, left, or right direction ((b), (c), (d), (e)) may correspond to a specific function. In a case where the thumb is positioned in an inclined direction ((f), (g), (h), (i)) and thus there is no specific corresponding function, it may be displayed that the user is requested to make a specific gesture. For example, the user may be guided to make a right pose by displaying the similar second and third guide popup windows GP2 and GP3 together with the first guide popup window GP1.

Figure 27:
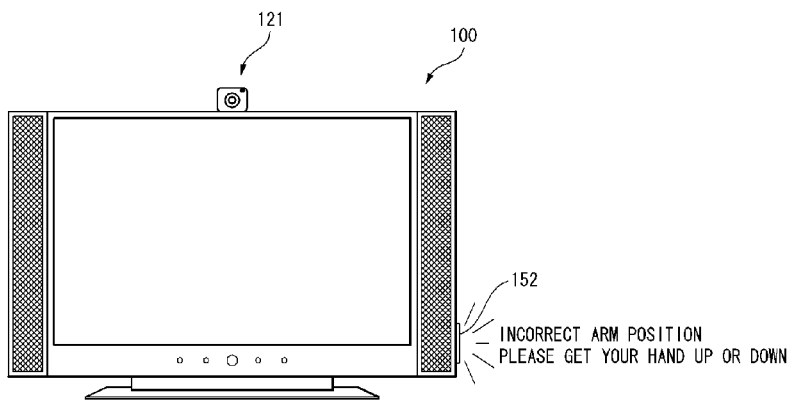
FIG. 27 is a view illustrating an operation of a display device according to an embodiment of the present invention.
Figure 27:
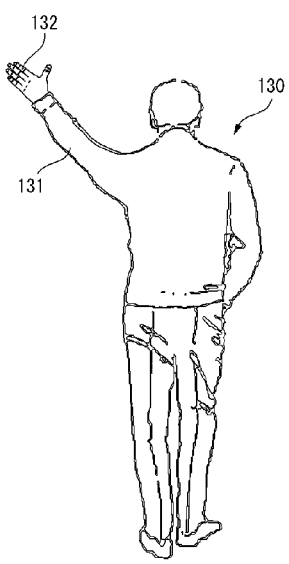

FIG. 27 is a view illustrating an operation of a display device according to an embodiment of the present invention.

As shown in FIG. 27, in a case where the user 130 makes an inaccurate gesture, the controller (180 of FIG. 1) of the display device 100 may guide the user to make an accurate gesture through a speaker that is the sound output unit 152.

Figure 28:
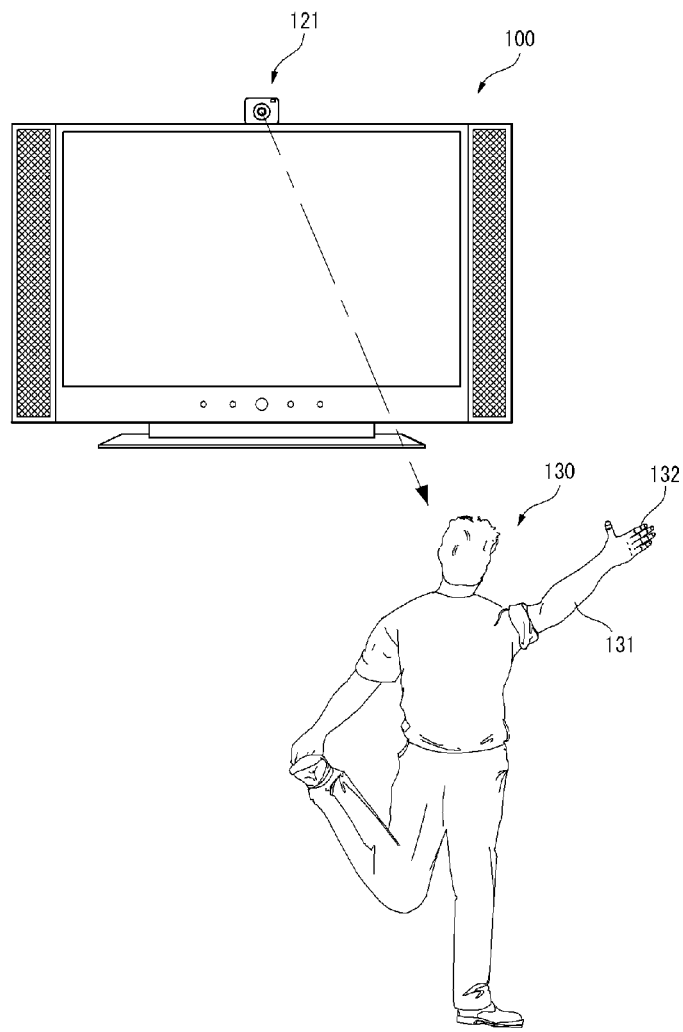
FIGS. 28 and 29 are views illustrating a process of obtaining a gesture according to an embodiment of the present invention.
Figure 29:
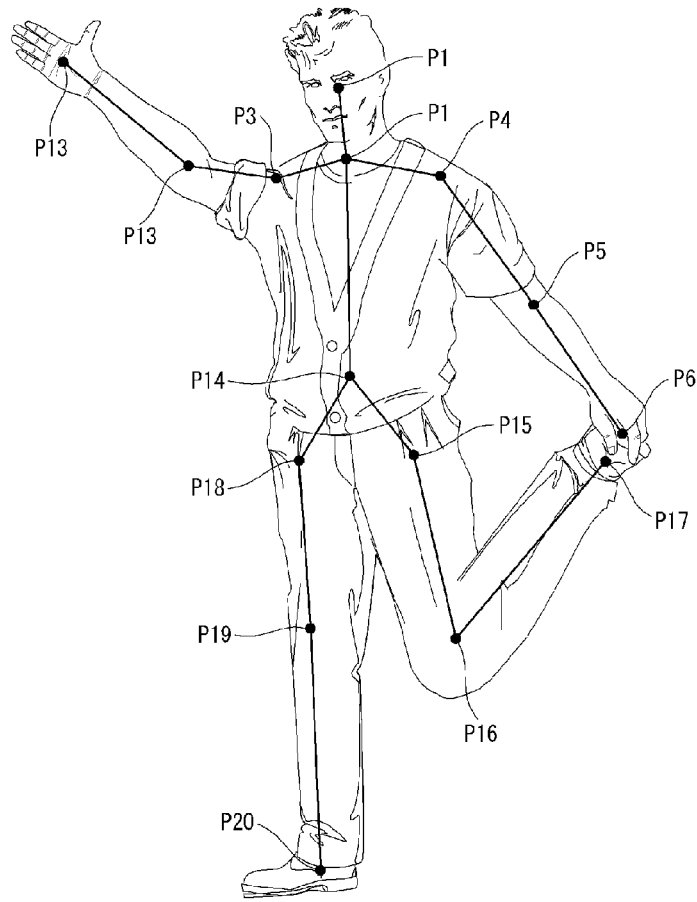

FIGS. 28 and 29 are views illustrating a process of acquiring a gesture according to an embodiment of the present invention.

As shown in FIGS. 28 and 29, the display device 100 may capture an image of the user 130 and analyzes user's gesture from the captured image. Hereinafter, a process of analyzing user's gesture will be described by an example of the controller (180 of FIG. 1) determining whether a yoga action taken by the user 130 is correct.

As shown in FIG. 28, the camera 121 may capture the user 130. The user 130 may be a person that retains a control right. Accordingly, even when a plurality of people are present, the controller (180 of FIG. 1) may allow the camera 121 to track the user 130 retaining the control right and capture an image including the user's gesture.

FIG. 29 illustrates a situation of extracting user's gesture from the image captured by the camera 121. As shown in FIG. 29, the controller (180 of FIG. 1) may analyze the captured image based on the operation points P1 to P20.

The operation points P1 to P20 may be set with respect to user's joints in the captured image. By doing so, the user's gesture may be extracted through a relative position between the operation points P1 to P20. For example, when the sixth operation point corresponding to user's wrist joint is positioned close to the seventeenth operation point P16 corresponding to user's ankle joint, the controller (180 of FIG. 1) may determine that the user 130 takes action of grabbing his foot with his hand. As such, by extracting the position of each of the operation points P1 to P20, it can be known that the user 130 takes action of grabbing his left foot with his left hand while lifting his right arm in an inclined direction.

Figure 30:
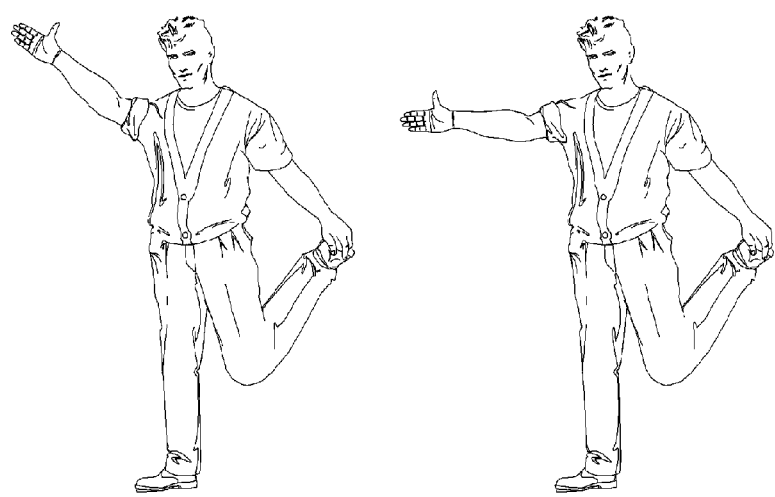
FIG. 30 is a view illustrating the gesture obtained in FIGS. 28 and 29 and a gesture according to correction data.

FIGS. 30A and 30B illustrate the gesture acquired in FIGS. 28 and 29 and a gesture by correction data.

As shown in FIG. 30A, it can be known that the user 130 makes a gesture of inclinedly lifting his right arm and grabbing his left foot with his left hand. The user 130 may make the gesture to perform a function for practicing a correct yoga pose. Accordingly, when the user 130 makes a specific yoga pose, the controller (180 of FIG. 1) may perform a function of displaying a correct yoga pose.

As shown in FIG. 30B, the correct yoga pose that is supposed to be made by the user 130 may be a gesture of extending user's right arm in a horizontal direction. The correct gesture that is supposed to be made by the user 130 may be stored in the memory (160 of FIG. 1). For example, correction data corresponding to the correct yoga pose may be stored in the memory (160 of FIG. 1). When an image including the user's pose is captured, the controller (180 of FIG. 1) may extract the user's pose from the image through a process of setting the operation points P1 to P20 in the image including the user's gesture. When the user's gesture is extracted, gesture (a) currently made by the user 130 may be compared with gesture (b) that is supposed to be made by the user 130. As shown in FIGS. 30A and 30B, when a difference occurs between gesture (a) and gesture (b), the user 130 may be guided to make a right pose.

Figure 31:
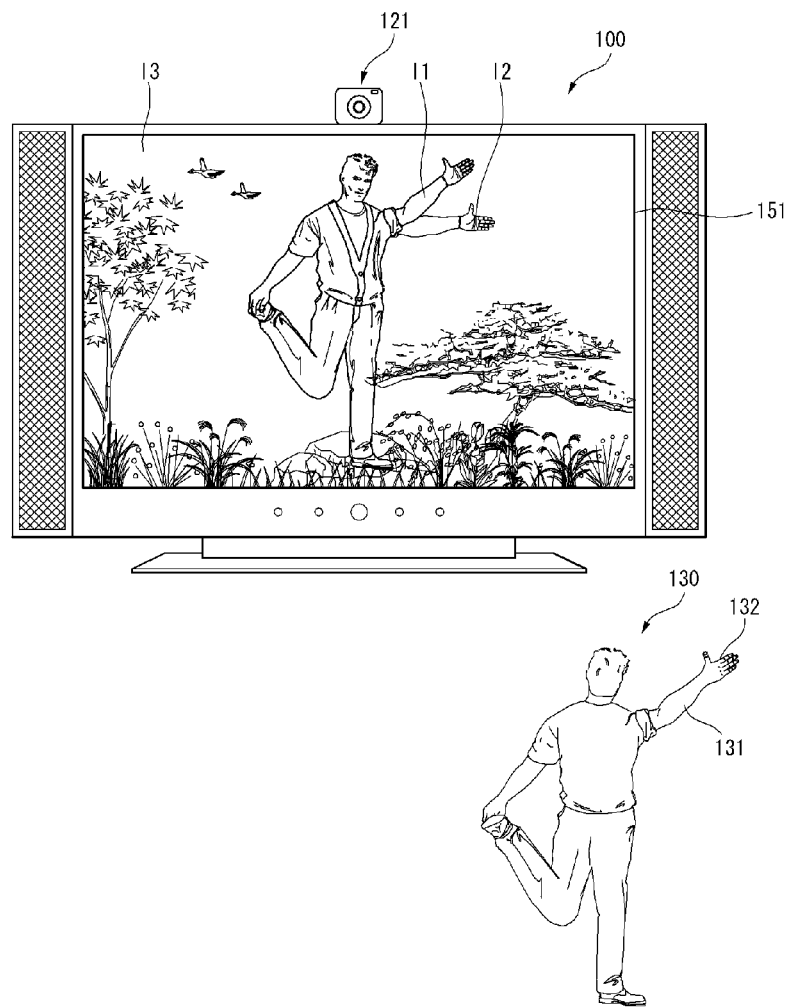
FIG. 31 is a view illustrating an operation of a display device displaying the gesture obtained in FIG. 29 and a corrected gesture.

FIG. 31 is a view illustrating an operation of the display device displaying the corrected gesture and acquired gesture shown in FIG. 28.

As shown in FIG. 31, the first image I1 captured by the camera 121 and the second image I2 determined to be provided by the controller (180 of FIG. 1) based on the user's pose may be displayed on the display unit 151. The first image I1 including the user's current gesture may be displayed on the display unit 151 together with the second image I2 that allows the user to notice determine what is wrong with the user's yoga pose. Based on the first image I2 and the second image I2 displayed together on the display unit 151, the user 130 may correct his pose.

The second image I2 may correspond to a shape of part of user's body.

The third image I3 that is a background image may be displayed on the display unit 151. For example, the third image I3 may be synthesized with the first and second images I1 and I2, and the synthesized image may be displayed on the display unit 151. Accordingly, even when the user makes a gesture before the display device 100 in a room, a beautiful outdoor background image may be displayed on the display unit 151, and this allows the user to have psychological stability.

FIG. 32 is a view illustrating an operation of the display device according to an embodiment of the present invention.

As shown in FIG. 32, the first, second, and third images I1, I2, and I3 may be displayed on the display unit 151. Further, an indicator may be displayed on the display unit 151 to clearly indicate how the user should change his pose. Further, a pose made by the user may be instructed by voice through a speaker that is the sound output unit 152.

The above embodiments as described above may be stored in a recording medium that may be read by a computer program to be executed in a computer. The embodiments may be implemented by software. When implemented by software, the components of each embodiment may be code segments, each executing a necessary operation. The program or code segments may be stored in a processor-readable medium or transmitted by computer data signals combined with a carrier through a transmission medium or over a communication network.

The computer-readable recording medium may include all types of recording devices that may store data read by a computer system. Examples of the computer-readable recording medium may include, but not limited to, ROMs, RAMs, CD-ROMs, DVD±ROMs, DVD-RAMs, magnetic tapes, floppy disks, hard disks, optical data storage, etc. Further, the computer-readable recording medium may store and execute a code that is distributed in computer devices interconnected over a network and readable by a computer in a distributed manner.

The invention has been explained above with reference to exemplary embodiments. It will be evident to those skilled in the art that various modifications may be made thereto without departing from the broader spirit and scope of the invention. Further, although the invention has been described in the context its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

The invention claimed is:

1. A display device comprising:
   a display;
   a memory;
   a camera; and
   a controller configured to:
   store a plurality of first gesture images corresponding to at least one function in the memory;
   obtain a basic image including a second gesture image of a user through the camera;
   extract the second gesture image from the basic image, and select a plurality of gesture images corresponding to the extracted second gesture image among the plurality of first gesture images stored in the memory;
   display, on the display, the extracted second gesture image, the plurality of selected gesture images, and at least one function information corresponding to the plurality of selected gesture images, the at least one function information identifying a function performed by the controller based on the plurality of selected gesture images;

obtain an additional basic image according to an additional gesture of the user through the camera and extract an additional second gesture image from the obtained additional basic image; and when the additional second gesture image corresponds to one of the selected gesture images, display the one of the selected gesture images and exclude other of the selected gesture images.

2. The display device of claim 1, wherein the controller displays the plurality of selected gesture images and the extracted second gesture image that overlap each other.

3. The display device of claim 1, wherein the controller extracts the second gesture image by setting up at least one operation point in the basic image so that a gesture of the user may be extracted.

4. The display device of claim 3, wherein the controller sets up the operation point at a position corresponding to a joint of the user.

5. The display device of claim 1, wherein an image processing unit included in the controller extracts the second gesture image.

6. The display device of claim 1, wherein the camera includes any one of at least one 2D camera, at least one 3D camera, and a combination of the at least one 2D camera and the at least one 3D camera.

7. A display device comprising:
a display;
a memory;
a camera; and
a controller configured to:
store a plurality of first gesture images in the memory;
obtain a basic image including a second gesture image of a user through the camera;
extract the second gesture image from the basic image, and select a plurality of gesture images corresponding to the extracted second gesture image among the plurality of first gesture images stored in the memory;
display, on the display, the extracted second gesture image, the plurality of selected gesture images, and at least one function information corresponding to the plurality of selected gesture images, the at least one function information identifying a function performed by the controller based on the plurality of selected gesture images;
obtain an additional basic image according to an additional gesture of the user through the camera and extract an additional second gesture image from the obtained additional basic image; and
when the additional second gesture image corresponds to one of the selected gesture images, display the one of the selected gesture images and exclude other of the selected gesture images.

8. The display device of claim 7, wherein the controller displays the plurality of selected gesture images and the extracted second gesture image that overlap each other.

9. The display device of claim 8, wherein the controller extracts the second gesture image by setting up at least one operation point in the basic image so that a gesture of the user may be extracted, and
wherein the overlapping is performed so that the second gesture image and the selected gesture image share at least one of the operation point.

10. The display device of claim 9, wherein the controller sets up the operation point at a position corresponding to a joint of the user.

11. A method of controlling a display device performing at least one function corresponding to a gesture image of the user, the method comprising:
obtaining a basic image including a first gesture image of a user;
extracting the first gesture image from the obtained basic image; and
when there is no function matching to the extracted first gesture image, displaying, on a display, the first gesture image, a plurality of second gesture images, and at least one function information corresponding to the plurality of second gesture images, the plurality of second gesture images corresponding to the at least one function, and the at least one function information identifying a function performed based on the plurality of second gesture images;
obtaining an additional basic image according to an additional gesture of the user and extracting an additional first gesture image from the additional basic image; and
when the additional first gesture image corresponds to one of the second gesture images, displaying the one of the second gesture images and exclude other of the second gesture images.

12. The method of claim 11, wherein obtaining the basic image is performed after a control right of the display device is provided to the user.

13. The method of claim 11, wherein the plurality of second gesture images are displayed to overlap the first gesture image.

14. The method of claim 11, wherein extracting the first gesture image includes setting up at least one operation point in the obtained basic image so that a gesture of the user may be extracted, and calculating at least one of a relative position of the at least one operation point and a distance between two operation points.

15. The method of claim 14, wherein the operation point is set up at a point corresponding to a joint of the user.

16. The display device of claim 1, wherein, when the additional second gesture image corresponds to the one of the selected gesture images, the controller performs a function corresponding to the displayed one of the plurality of selected gesture images.

* * * * *